United States Patent [19]

Moss

[11] 4,150,276

[45] Apr. 17, 1979

[54] HOLDER FOR AIR CARBON ARC ELECTRODE

[76] Inventor: Paul B. Moss, 202 S. Lansing, Tulsa, Okla. 74120

[21] Appl. No.: 894,929

[22] Filed: Apr. 10, 1978

[51] Int. Cl.² ............................................. B23K 9/00
[52] U.S. Cl. .................................. 219/70; 24/132 R; 24/273; 219/144
[58] Field of Search ......... 138/144; 24/132 R, 243 R, 24/273, 270; 339/274; 219/70, 138, 139, 140, 141, 142, 143, 144

[56] References Cited

U.S. PATENT DOCUMENTS

| 1,372,432 | 3/1921 | Jansen et al. ........................ 219/144 |
| 2,031,091 | 2/1936 | Berg .................................... 24/132 R |
| 2,064,908 | 12/1936 | Gruell .................................. 219/144 |
| 2,304,321 | 12/1942 | Wagner ................................ 219/138 |
| 2,358,800 | 9/1944 | Fuller .................................. 219/144 |
| 2,361,284 | 10/1944 | Gooderham ......................... 219/140 |
| 2,731,280 | 1/1956 | Goodliffe et al. ..................... 24/273 |
| 2,899,536 | 8/1959 | Hoese et al. ......................... 219/138 |
| 2,935,597 | 5/1960 | Hugo .................................... 219/140 |

Primary Examiner—Thomas J. Kozma
Attorney, Agent, or Firm—Head, Johnson & Chafin

[57] ABSTRACT

A holder for a cylindrical carbon arc electrode, comprising an elongated body of selected metal, having a forward and a rearward end, and a tubular handle attached to the bottom surface, at a selected angle. The top surface of the body has a longitudinal groove adapted to receive a cylindrical electrode and hold it co-linear with the top surface of the body. A quick-acting toggle clamp or latch means is provided, so that by simply pivoting a wire lever the latch can be loosened, and the position of the electrode in the groove can be altered. Various shapes and constructions can be provided, and the bail of the clamp can press directly on the electrode, or through means of metal blocks, etc.

7 Claims, 5 Drawing Figures

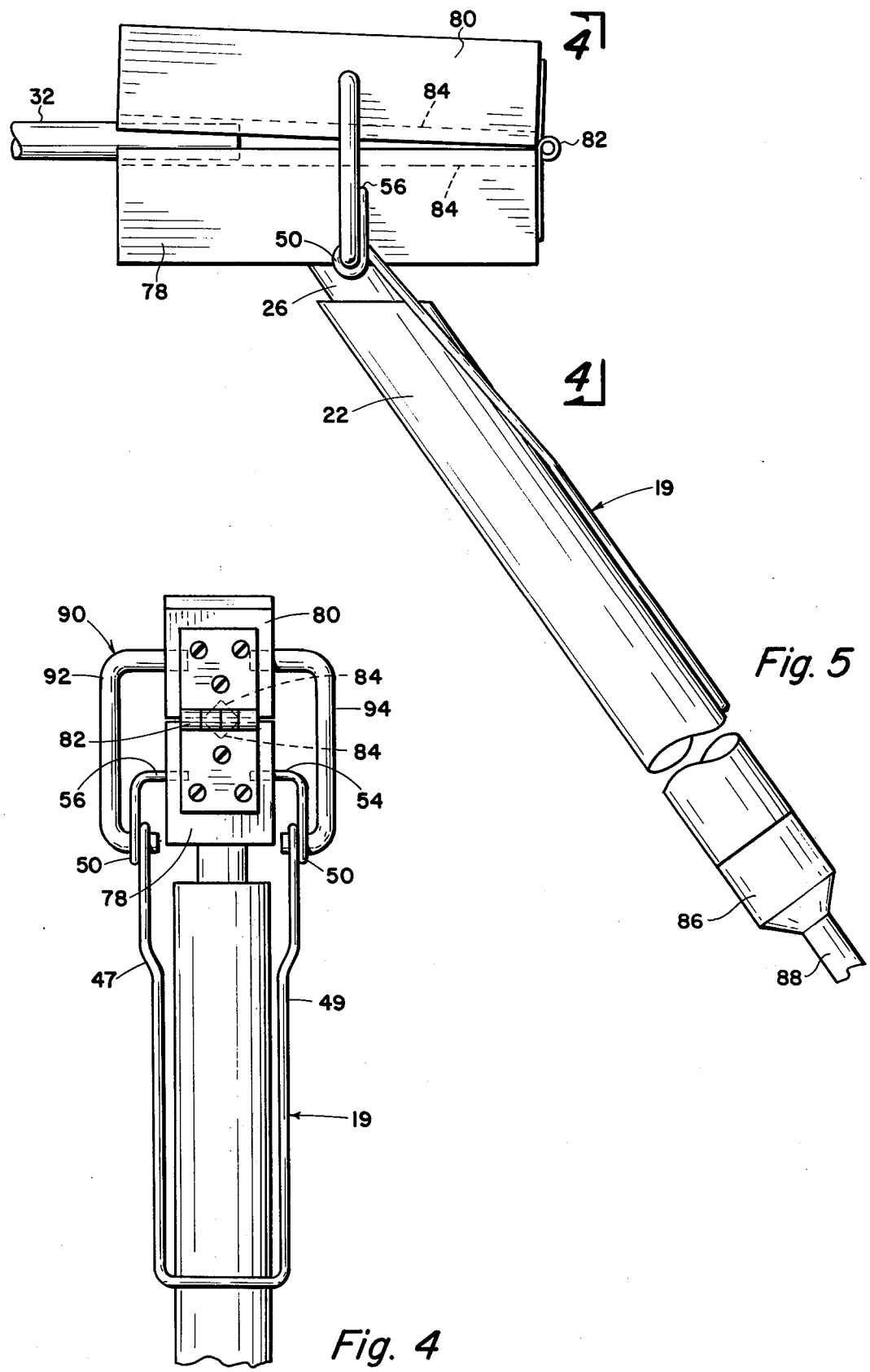

HOLDER FOR AIR CARBON ARC ELECTRODE

CROSS-REFERENCE TO RELATED PATENT

This application is related to my U.S. Pat. No. 4,045,649 with co-inventor Gilbert L. Watson, entitled "Holder for Carbon Arc Electrodes". U.S. Pat. No. 4,045,649 is entered by reference into this application.

BACKGROUND OF THE INVENTION

A technique for cutting metal which has been used for some time, is that of imposing a low voltage, high current electric source between the work to be cut, and a carbon electrode. An electric arc is formed between the electrode and the workpiece, which creates an area of high heat intensity, which melts a localized area of the workpiece. To remove the molten metal formed in the localized area, an air stream is directed to blow it away.

In order to effectively accomplish cutting of metal using this technique, a holder is required to perform plural functions, of holding the carbon arc electrode in a way so that the extension of the electrode from the holder can be easily adjusted, plus providing a means of maintaining low resistance electrical connection with the electrode, and at the same time providing a means of directing an air stream along the electrode to blow away molten metal formed in the cutting process.

One principal problem with the prior art types of holders is that it is necessary to make good electrical contact between the holder and the electrode, while at the same time providing an easy means for adjusting the length of the electrode relative to the holder. The arc formed by the electrode with the molten metal gradually eats away the carbon electrode, so that it must be periodically extended relative to the holder. For these reasons, a common means of using carbon arc electrodes is to utilize the holder, which provides for adjusting the length of the electrode extension from the holder. Because of the high currents involved in the apparatus, any resistance caused by poor contact causes high temperatures to develop, and any imperfections in the contact between the holder and the electrode may result in arcing, which not only reduces the life of the electrode but generates substantial amounts of additional heat. For this reason it is highly important that a minimum of electrical resistance exist between the holder and the electrode, while at the same time providing means for easily moving the electrode relative to the holder.

SUMMARY OF THE INVENTION

It is therefore an important object of this invention to provide an improved holder for carbon arc electrodes. More particularly, an object of this invention is to provide an improved holder for carbon arc electrodes, including improved means of achieving and maintaining effective electrical connection between the holder and the electrode. Still more particularly, an object of this invention is to provide a holder for carbon arc electrodes, including means of providing improved electrical contact between the holder and the electrode and in addition providing means whereby the adjustment of the electrode relative to the holder is easy, and can be expeditiously accomplished by the user.

Another object of the invention is to provide a holder for carbon arc electrodes utilizing a flow of air to blow the molten metal from the area cut, including improved means for directing the flow of air along the electrode.

These and other objects are realized and the limitations of the prior art are overcome in this invention by providing a body which is of elongated shape and of selected metal, such as copper, by way of example, but not of limitation. A tubular handle is attached to a bottom surface of the body. This attachment of the handle to the body can be by welding or brazing, or other well-known means. The handle is generally electrically insulated. On the upper surface of the body opposite to that to which the handle is attached, is a longitudinal groove or channel of selected cross-section. One cross-section might be, for example, a semi-circular surface of the same radius as the cylindrical carbon electrode, so that good electrical contact will be provided over a larger surface area of the electrode.

Another type of groove can be a Vee-shape, which still provides a considerable area of contact with a cylindrical electrode but is more useful in the sense that it can accept electrodes of different diameters and can hold them rigidly, whereas if the groove were semi-cylindrical, a smaller or larger electrode would not fit as well into the groove.

A longitudinal drilled opening from the front end of the body, close to the slot or groove, is provided so that compressed air supplied to the inside of the tubular handle can be passed up into the block, and out through the longitudinal opening, and the air blast then will flow along the surface of the electrode and will maintain sufficient velocity to remove the molten metal as it is formed.

Knowing that the carbon burns away as the process continues, it is necessary to continually reposition the electrode in the groove of the body, and therefore a quick-acting, simple latch or clamp means is required. The clamp comprises a wire bail in the form of a U-shaped rectangle, with the ends of the two arms bent inwardly. A wire lever is formed in the shape of a U with long arms, each of the two arms is bent into a single turn loop, providing a bearing opening into which the two ends of the arms of the bail are inserted. The arms of the lever extend beyond the loops by a short distance and are also bent inwardly. Two co-linear openings are provided on the sides of the body, into which the short bent ends of the lever are inserted. Thus, they form a pivot about which the lever rotates, and as it rotates it carries the ends of the bail downwardly away from the top surface of the body, and thus the bail presses on the top of the electrode which is seated in the groove, and securely locks it into position. The dimensions of the bale and the lever are such that the bail is carried beyond a perpendicular position with respect to the top surface of the body, and is therefore locked by means of a toggle action.

To adjust the position of the electrode, all that is required is to simply pivot the wire lever, which rests against the surface of the handle. This loosens the bail, and the electrode can then be moved to a new position. As the wire lever is brought against the handle again, it locks and therefore, there is no need for detailed operations to lock the bail or to lock the lever, the toggle action provides the complete action.

BRIEF DESCRIPTION OF THE DRAWINGS

These and other objects and advantages of this invention and a better understanding of the principles and details of the invention will be evident from the following description taken in conjunction with the appended drawings in which:

FIGS. 4 and 5 show back and side elevations of another embodiment of the invention, in which a slightly different clamp action is provided.

DESCRIPTION OF THE PREFERRED EMBODIMENT

Figures 1, 2, 3:
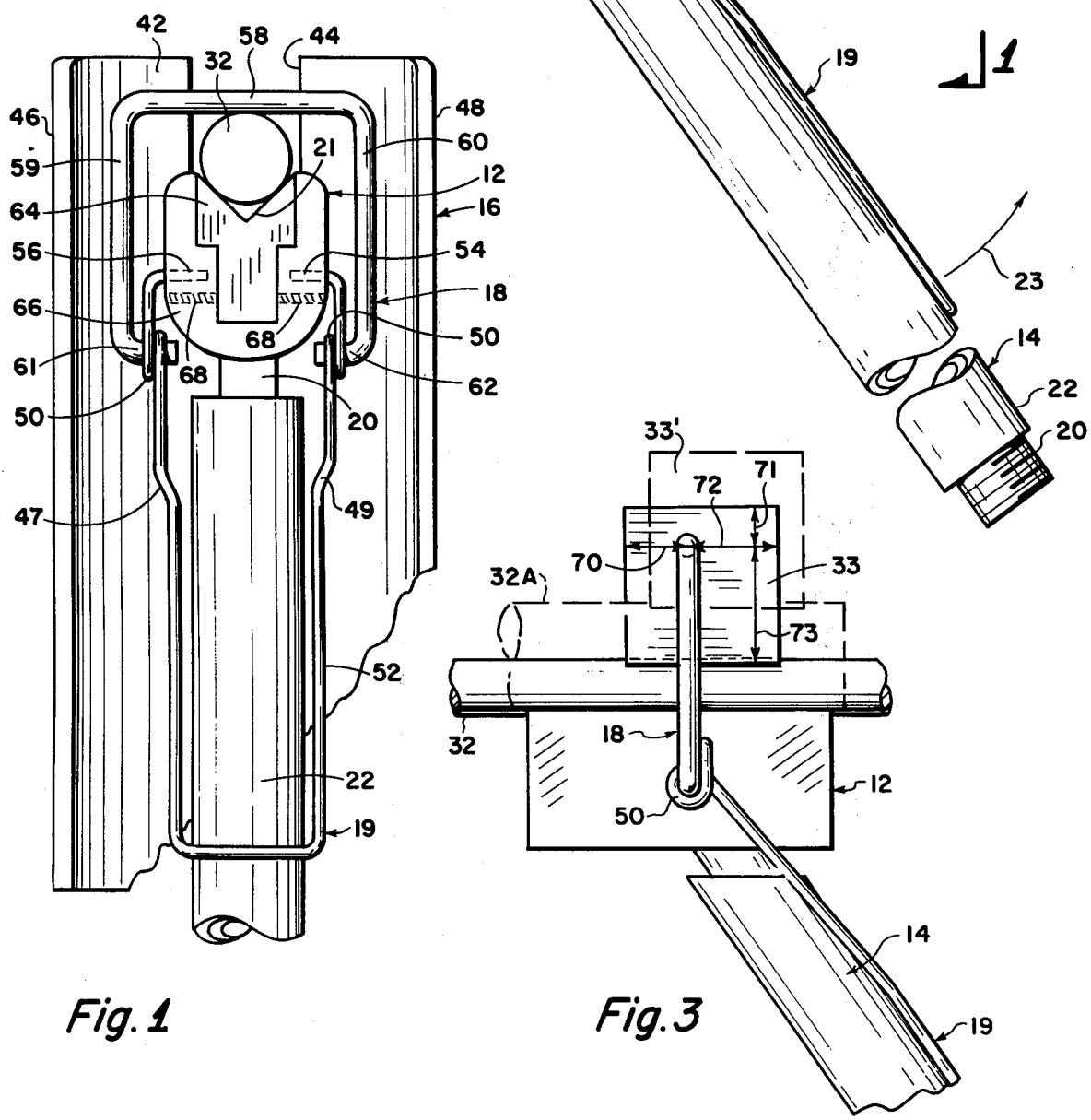
FIGS. 1 and 2 show a back elevation and side elevation of one embodiment of this invention.
FIG. 3 illustrates a modification of the bail of the clamp of FIGS. 1 and 2.

Referring now to the drawings and in particular to FIGS. 1 and 2, there is shown one embodiment of this invention. Indicated by the numeral 10 is the entire device. Numeral 12 indicates generally the body portion of the apparatus. Numeral 14 indicates generally the handle portion. Numeral 16 indicates generally a shield portion, while numerals 18 and 19 represent generally, respectively, the bail and the wire lever of the clamp mechanism.

The body, indicated generally by the numeral 12, can be a rectangular block of metal of good electrical conductivity, such as, for example, copper. It can be shaped in any desired form. Also, while it can be oriented in any desired direction, it will, for convenience, be described in terms of its position in FIG. 2 in which the body is a longitudinal block of metal with its long edges horizontal, having a forward end 15, in which direction the electrode projects, in order to separate, and a rearward end 17.

Attached to the bottom surface 11 is a handle, indicated generally by the numeral 14, which comprises a tube or pipe 20 of suitable metal, covered with electrical and thermal insulation 22. This handle is set at a selected angle 23 with the bottom surface 11 of the body. This is for convenience in holding and operating the tool. It can be seen that handle 14 could be attached to the end surface 17 of body 12.

There is an internal bore 34 leading from the position over which the handle is attached, so that air supplied to the interior of the tube 20 can pass up through the bored opening 34, and through a horizontally bored opening 36, which is positioned substantially parallel to, and close to, the groove 21 in the top surface of the body. Thus, compressed air supplied to 20 will pass up through the handle, through the opening 34, and down the opening 36, and will issue as a high velocity jet, parallel to the edge of the electrode, to impinge on a work surface.

Electrical power is applied to the electrode by way of pipe 20, such as by means of the fixture 86 attached to pipe 20, as shown in FIG. 5.

The electrode 32 seats in the Vee slot 21 and is aligned co-linear with the body 12. There are two parts to the clamp, one is a heavy wire bail indicated generally by the numeral 18, which can be square or rectangular or any selected shape, in the form of a U, with the two arms of the U bent inwardly. There is an operating lever indicated generally by the numeral 19 which comprises a U-shaped wire frame having two arms 47 and 49. Each of these arms are bent in a one-turn circular loop 50, which has a central opening of the proper diameter to accept the two in-bent ends of the bail. The two arms 47 and 49 extend farther, and are then bent inwardly also, to form two inwardly directed ends 54 and 56. These fit into two co-linear openings drilled in the sides of the body 12, which form hinges for rotation of the lever 19 about the two ends 54 and 56. Of course, the lever 19 can be made of metal strip instead of wire, if desired.

By looking at FIG. 2, it will be clear that as the lever 19 is lifted from its position along the handle 14 and rotated counterclockwise, it will rotate about the ends 54 and 56, and thus the circular loops 50 will move on a path 25 which is circular with respect to the hinges 54 and 56. Thus, the bail will be lifted and the pressure of the top bar 58 will be removed from the electrode 32, thus permitting the electrode to be shifted along the groove to any desired position. Then, as the lever 19 is moved back down in contact with the handle, the loops 50 move back down along the curve 25, pulling the bail tight against the electrode, and past dead center, so that the bail and handle are locked in their present position.

Indicated in FIGS. 1 and 2 is an insulated shield, indicated generally by the numeral 16, which comprises a shallow U-shaped channel, which is fastened, such as by means of a bracket 38, to the bottom surface of the body. This serves to insulate the body from grounded surfaces, and minimizes the splatter on the operator's hand holding the handle, and so on. There is a groove 44 in the top of the guard so that the electrode 32 can pass through and so that the bore 36 is not covered so that the air jets can pass down to the workpiece. It will be clear, of course, that this electrode holder can be used without the shield 16.

It will be clear that slight variations in shape and construction of the toggle clamp can be provided. One such variation, which is adaptable to the use of different diameter electrodes, is shown in FIG. 3. This includes a block 33 which is in rectangular form, and which has Vee grooves along each edge. The bail 18 is arranged to pass through the block at a selected point on each side. This point is selected so that the distance from the bail to the edges of the block, such as 70, 72, 71, and 73, for example, are all of different selected dimensions, such that four different diameters of electrodes can be used. 33' in dashed line illustrates the operation with a larger diameter electrode 32A, as compared to the electrode 32.

Another form of the block 33 of FIG. 3 is shown in FIGS. 4 and 5. Here the block 80 is more or less of a mirror image of the body 78, each of them having a Vee groove on their mating surfaces. They may be attached at one end, such as by hinge 82 at the back surface 17. The electrode 32 is inserted into the space between the two grooves 84, while the bail is lifted. Then as the lever 19 is pulled down, the bail pulls the top block 80 with its groove 84 down in combination with the body 78 and its groove 84 to lock the electrode.

In FIG. 4 the bail 90 is shown as being made of two parts 92 and 94, which is similar to that in FIG. 1 with a portion cut out of the cross bar 58. These two parts 92 and 94 can then be inserted into the sides of the block 80. However, an alternate way would be to have the bail pass directly through the block 80 before the two sides 92 and 94 have been bent. While I speak of "passing through", I mean the term to include the case as in FIG. 3 where the top bar 58 passes completely through the block, or as indicated in FIG. 4, where the bale is cut into two pieces, and each piece is inserted separately into the side of the block.

Thus, several ways have been shown by means of which the bail can contact and clamp the electrode. One is by direct contact of the bail with the electrode, another is by means of an intervening block with a Vee edge as shown in FIG. 3. A third is to provide a hinged block that is pulled down by the bail. Other means, including leaf springs, and so forth, can be used to press from the bail onto the spring, and then onto the electrode, for example.

What has been described is a simple, rapid, convenient toggle clamp, that can be used to bind securely the electrode to the body, so that good electrical contact can be made between the body and the electrode, and still have it possible to quickly release the electrode so that it can be moved longitudinally, and then be reclamped to the body.

The body 12 can be, as shown in FIGS. 4 and 5, a rectangular block 78, with a groove or slot on top of selected cross-section, such as circular or Vee. The bottom surface can be plane as in FIG. 4, or can be of other contour, such as shown in FIG. 1, for example. The block can be all of one metal as in FIG. 4, or it can have a metal insert 64 of selected metal, such as copper, for example, set into a corresponding groove into another metal or insulating material 66.

While I show the compressed air passing through the handle 14 to the body, this is for convenience only, and the compressed air tube 88 can be attached directly to the body, if desired.

The invention has been illustrated and described as the lever 19 is mounted on the top of the handle 14, with the electrode being loosened as the lever is pivoted upwardly and tightened when it is pivoted downwardly against the handle. It is apparent that lever 19 can just as well be mounted on the bottom of handle 14 and arranged so that the U-shaped bail is loosened when the lever is pivoted away from the handle and tightened when it is pivoted towards the handle. The clamping means works in the same way, using the same components, whether the lever 19 is mounted on top or on bottom of handle 14.

While the invention has been described with a certain degree of particularity, it is manifest that many changes may be made in the details of construction and the arrangement of components. It is understood that the invention is not to be limited to the specific embodiments set forth herein for purposes of exemplification, but is to be limited only by the scope of the attached claim or claims, including the full range of equivalency to which each element thereof is entitled.

What is claimed is:

1. A holder for a cylindrical carbon arc electrode, comprising:

an elongated body having a forward end and a rearward end, having a longitudinal groove in the top surface configured to receive a carbon arc electrode therein and having an air passageway therein adjacent said groove and extending to the forward end;

a tubular handle attached to said body having communication with said air passageway;

means of supplying compressed air to said tubular handle;

means to connect electric power to said body;

a U-shaped wire bale, the ends of which are turned inwardly, the bale being dimensioned to extend over the top of said body and to receive a carbon arc electrode between the bale and said longitudinal groove; and a wire lever in the form of a long U shape, the two arms each being bent in a single turn circular loop near their ends, the loops receiving the bent ends of said bail, the ends of said wire lever being bent inwardly, and adapted to fit, one from each side, into two co-linear openings in the side walls of said body, whereby as said lever is rotated about said bent ends in said openings, said bail is drawn tightly against said electrode, and locked there by toggle action.

2. The electrode holder as in claim 1 in which the cross-section of said groove is approximately semi-cylindrical and of the same radius as said electrode.

3. The electrode holder as in claim 1 in which the cross-section of said groove is a Vee, adapted to hold electrodes of different diameter.

4. The electrode holder as in claim 1 including insulated shield means attached to said forward end of said body.

5. The electrode holder as in claim 1 including a block, through which said bail passes, said block having a Vee groove on its edge which presses on the top of said electrode.

6. The electrode holder as in claim 5 in which said block is substantially of the same width and length as said body, and is hinged to said body at their rearward ends.

7. The electrode holder as in claim 5 in which said block is rectangular and said bail passes through said block at a point which is at a different selected distance from each edge of said square;

whereby a plurality of electrodes of different selected diameters can be locked in said groove in said body.

* * * * *